US012756116B2

(12) United States Patent
Ender

(10) Patent No.: US 12,756,116 B2
(45) Date of Patent: Oct. 6, 2026

(54) STRAND PROTECTIVE PLATE

(71) Applicant: Neutrik AG, Schaan (LI)

(72) Inventor: Norbert Ender, Fraxern (AT)

(73) Assignee: Neutrik AG, Schaan (LI)

( * ) Notice: Subject to any disclaimer, the term of this patent is extended or adjusted under 35 U.S.C. 154(b) by 299 days.

(21) Appl. No.: 18/566,096

(22) PCT Filed: May 16, 2022

(86) PCT No.: PCT/EP2022/063131
§ 371 (c)(1),
(2) Date: Dec. 1, 2023

(87) PCT Pub. No.: WO2023/274618
PCT Pub. Date: Jan. 5, 2023

(65) Prior Publication Data
US 2024/0250455 A1 Jul. 25, 2024

(30) Foreign Application Priority Data
Jun. 30, 2021 (DE) ......................... 102021116778.7

(51) Int. Cl.
*H01R 4/36* (2006.01)
*H01R 4/48* (2006.01)
*H01R 12/51* (2011.01)

(52) U.S. Cl.
CPC ............. *H01R 4/363* (2013.01); *H01R 4/489* (2013.01); *H01R 12/515* (2013.01)

(58) Field of Classification Search
CPC .......... H01R 4/363; H01R 4/36; H01R 4/489; H01R 12/515
See application file for complete search history.

(56) References Cited

U.S. PATENT DOCUMENTS 3,426,319 A 2/1969 Downs et al.
4,401,357 A * 8/1983 Dvorachek .......... H01R 13/508 439/448
5,192,234 A * 3/1993 Heng ..................... H01R 4/363 439/806

(Continued)

FOREIGN PATENT DOCUMENTS

CN 210576526 U 5/2020
DE 2409131 A1 9/1975

(Continued)

*Primary Examiner* — Oscar C Jimenez
(74) *Attorney, Agent, or Firm* — Volpe Koenig

(57) ABSTRACT

A strand protective plate for clamping a strand of an electric cable in a strand clamping body by means of a clamping screw which acts on the strand protective plate and is screwed into the strand clamping body, wherein the strand protective plate has a strand clamping tongue for bearing against the strand and a bent-over region and a contact region for bearing against the strand clamping body. The strand clamping tongue is connected by means of the bent-over region to the contact region, and a leadthrough opening for guiding the clamping screw through is arranged in the contact region. At least one clamping jaw fixedly clamps the damping screw which is guided through the leadthrough opening is configured on the contact region adjacently with respect to the leadthrough opening.

9 Claims, 7 Drawing Sheets

(56) References Cited

U.S. PATENT DOCUMENTS

Figure 1:
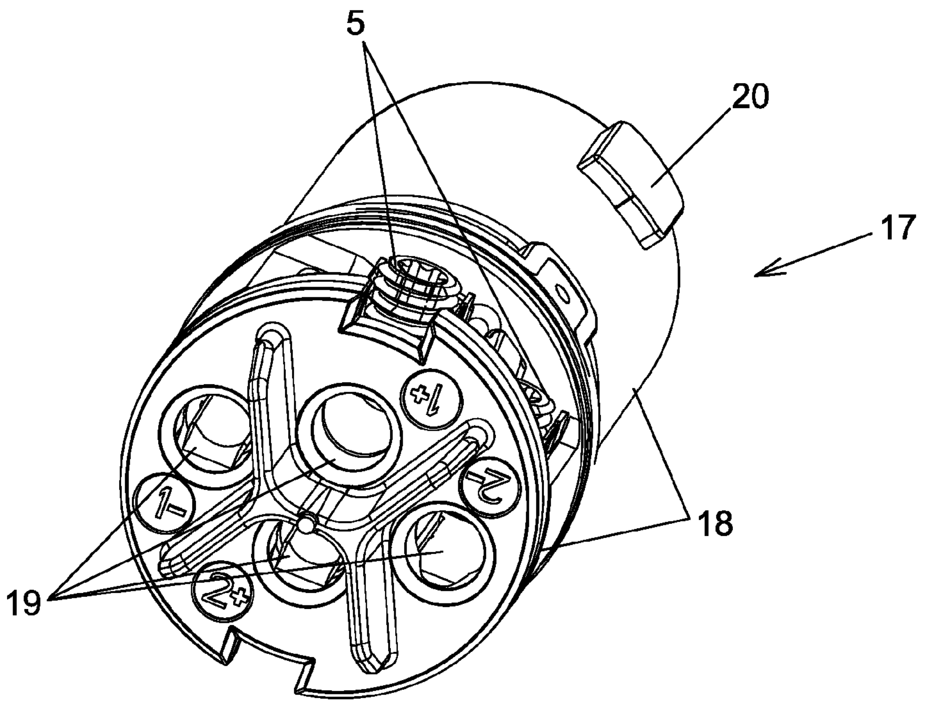

| | | | | |
|---|---|---|---|---|
| 7,445,526 | B2 * | 11/2008 | Neese .................... | H01R 4/363 439/806 |
| 9,660,357 | B1 * | 5/2017 | Worsham ............... | H01R 4/363 |
| 2011/0269333 | A1 | 11/2011 | Bussieres et al. | |

FOREIGN PATENT DOCUMENTS

| | | | |
|---|---|---|---|
| DE | 3413740 | C2 | 11/1987 |
| DE | 102005047867 | A1 | 4/2007 |
| FR | 1352160 | A | 2/1964 |
| FR | 2258716 | B3 | 8/1975 |
| FR | 2358575 | A1 | 2/1978 |
| GB | 1454155 | A | 10/1976 |
| GB | 1523507 | A | 9/1978 |
| GB | 2069775 | B | 8/1981 |
| SU | 1628112 | A1 | 2/1991 |

* cited by examiner

STRAND PROTECTIVE PLATE

The present invention relates to a strand protective plate for clamping a strand of an electric cable in a strand clamping body by means of a clamping screw which acts on the strand protective plate and is screwed into the strand clamping body, wherein the strand protective plate has a strand clamping tongue for bearing against the strand and a bent-over region and a contact region for bearing against the strand clamping body, wherein the strand clamping tongue is connected by means of the bent-over region to the contact region and a leadthrough opening for guiding the clamping screw through is arranged in the contact region.

Strand protective plates of this type are known in the prior art per se. They are used to ensure that the strand of an electric cable is securely clamped by the clamping screw when it is fastened in a strand clamping body and is not excessively damaged. For this purpose, it is provided that the clamping screw does not act directly on the strand when the respective strand is clamped in the strand clamping body, but with the strand clamping tongue acting in between.

Such strand protective plates are used in a wide variety of electrical plugs. When these connectors are delivered, the clamping screws are usually only loosely screwed into the strand clamping body. The strands are then often only clamped later in the strand clamping body by means of the clamping screws and the strand protective plate.

When the electrical plugs are delivered and transported, the strands of the electrical cable are usually not yet attached to the strand clamping body, so that vibrations can cause the clamping screws to come loose from the strand clamping bodies and thus either get lost during transport or subsequently have to be screwed back into the respective strand clamping body at least at great expense.

In order to prevent this, it is already known in the prior art to fix the clamping screws in the strand clamping body by means of adhesive or thread deformation for transport. However, this is time-consuming because the application of the adhesive or the thread deformation represents an additional work step in the manufacture of the electrical plug.

It is the object of the invention to provide a different solution for this problem, which prevents the clamping screws on electrical plugs from being unintentionally disengaged from the strand clamping body during transport due to vibrations or the like.

To solve this problem, the invention proposes a strand protective plate according to claim 1.

It is thus provided in accordance with the invention that at least one clamping jaw is formed on the contact region adjacent to the leadthrough opening for fixedly clamping the clamping screw which is guided through the leadthrough opening.

In the invention, the strand protective plate thus has at least one clamping jaw with which the clamping screw screwed into the strand clamping body is held in a fixedly clamping manner, so that the clamping screw can no longer be accidentally loosened and fall out of the strand clamping body during transport.

Even though it is explicitly mentioned here that the strand protective plate is suitable for clamping a strand, i.e. several wires twisted together, it is pointed out that with strand protective plates according to the invention, individual wires can of course also be clamped in the strand clamping body.

It is particularly preferably provided that on the contact region on opposite sides of the leadthrough opening and adjacent to the leadthrough opening a clamping jaw is formed in each case for fixedly clamping the clamping screw which is guided through the leadthrough opening between the clamping jaws.

Regardless of whether the strand protective plate has one or two or more clamping jaws, the clamping jaws are preferably of elastically resilient design. They could also be referred to as resilient lugs. The strand protective plate is preferably made of an electrically conductive material, particularly preferably metal. Preferred variants provide that the entire strand protective plate is formed in one piece.

Particularly preferably, the strand protective plate is a stamped and bent part. A stamped and bent part is a component which is produced from a sheet by stamping and bending operations.

The invention thus eliminates the need for the previously required bonding or thread deformation. The strand protective plate itself ensures that the clamping screw can no longer be accidentally released from the strand clamping body by vibration.

It is thus provided that the clamping jaw or jaws bear against the clamping screw guided through the leadthrough opening in such a way that they retain the clamping screw in a clamping manner. Particularly preferred variants provide that the clamping jaw, preferably each of the clamping jaws, has a freely projecting end edge for engagement in a thread of the clamping screw.

It is particularly preferably provided that the end edge of one of the clamping jaws extends further in the direction of the strand clamping tongue than the end edge of the clamping jaw arranged on the side of the leadthrough opening opposite thereto. In this case, it is possible to adapt the position of the end edges to the thread pitch of the thread of the clamping screw to be used in each case. It is then particularly preferably provided that one of the end edges extends further in the direction of the strand clamping tongue than the end edge of the clamping jaw arranged on the opposite side of the leadthrough opening by the amount of half the thread pitch of the clamping screw. This also prevents unintentional skewing of the clamping screw as it passes between the clamping jaws and their end edges.

In the case of two clamping jaws opposite each other with respect to the leadthrough opening, the distance of the end edges of these two clamping jaws from each other before the clamping screw is screwed in is advantageously somewhat smaller than the outer diameter of the clamping screw. This leads to particularly good clamping of the clamping screw between the clamping jaws. The clamping jaw or jaws are therefore deflected elastically when the clamping screw is screwed into the strand clamping body, which means that they then bear against the clamping screw with a certain pretension to hold it in clamping manner firmly in place.

In order to make the insertion of the clamping screw somewhat easier, it can be provided that the clamping jaw, preferably each of the clamping jaws, has an insertion bevel for the clamping screw at its end opposite the freely projecting end edge.

It is particularly preferably provided that the clamping jaws arranged on the opposite sides of the leadthrough opening and adjacent to the leadthrough opening are arranged so as to diverge obliquely relative to one another starting from their respective end edges. It could also be said that the clamping jaws are preferably arranged tapering towards each other towards their end edges. On the one hand, this also simplifies insertion of the clamping screw between the two clamping jaws. On the other hand, this also improves the clamping retention of the clamping screw arranged between the clamping jaws. Particularly preferably, the clamping jaws enclose an angle relative to one another in the range from 10° to 60°, preferably from 10° to 30°, and in a particularly preferred variant an angle of 24°.

In any case, it is preferably provided that the clamping jaw or jaws is or are arranged, preferably each thereof, at least for the most part on the side of the contact region opposite the strand clamping tongue.

The strand clamping tongue, i.e. the area of the strand protective plate which is intended to lie directly against the strand, can be curved in itself to form a recess which encloses the strand in certain areas. As seen in a side view, the strand clamping tongue and the contact region can be arranged parallel to each other in the not yet assembled state. Preferably, however, it is provided that the strand clamping tongue and the contact region, as seen in said side view, diverge at an angle opening away from the bent-over region. This angle is favorably in a range between 4° and 10°, particularly preferably between 5° and 7°. This slight angular position between the strand clamping tongue and the contact region in the unloaded state of the strand protective plate simplifies the insertion of the strand clamping tongue into the strand receiving space of the strand clamping body.

In order to be able to fix the strand protective plate together with the strand clamping body in a plug housing of an electrical plug in a simple manner, preferred variants of the invention provide that a fixing lug angled relative to the contact region is arranged on the contact region of the strand protective plate on the side opposite the bent-over region. This fixing lug can press against the plug housing in such a way that the strand clamping body together with the strand protective plate is fixed in position in the plug housing in a simple manner.

In addition to the strand protective plate per se, the invention also relates to an electrical plug contact having a contact pin and a strand clamping body and a clamping screw screwed into the strand clamping body as well as a strand protective plate according to the invention. In the case of such an electrical plug contact, it is provided in accordance with the invention that the clamping screw is passed through the leadthrough opening in the contact region of the strand protective plate and is screwed into the strand clamping body and is held in a clamping manner by means of the at least one clamping jaw. The strand clamping body and the contact pin can, for example, be designed as an integral component.

In this case, it may be a turned part, for example. However, it is just as possible for the contact pin and the strand clamping body to be initially designed as two separate components. The contact pin can then be clamped in the strand clamping body together with the strand. In this case in particular, the contact pin may be a stamped and bent part. In electrical plugs, both of the above variants or only one of each of the above variants can be implemented. If the contact pin and the strand clamping body are an integral component, they can be arranged in a particularly space-saving manner inside an insertion space of the electrical plug, into which the electrical contacts of the mating connector are inserted. If a contact pin is a stamped and bent part, it is preferably arranged on the outer circumference of the insertion space of the electrical plug. It is understood that both variants of contact pins mentioned can also be used in a different way and/or at a different location.

In addition to the strand protective plate and the electrical plug contact, the invention also relates to an electrical plug for transmitting electrical power and/or electrical signals, wherein the plug comprises a plug housing and at least one electrical plug contact according to the invention. Such electrical plugs according to the invention can be used as pure electrical plugs, i.e. only for transmitting electrical signals or electrical power. However, such electrical plugs according to the invention can also be hybrid connectors, which are designed to transmit both electrical power or electrical signals and optical signals.

In the following, preferred details and features of strand protective plates, electrical plug contacts and electrical plugs according to the invention are explained by way of exemplary embodiments, wherein:

FIGS. 1 to 21 show illustrations of a first exemplary embodiment of an electrical plug according to the invention with corresponding strand protective plates, and FIGS. 22 to 26 variants modified therefrom.

Figure 2:
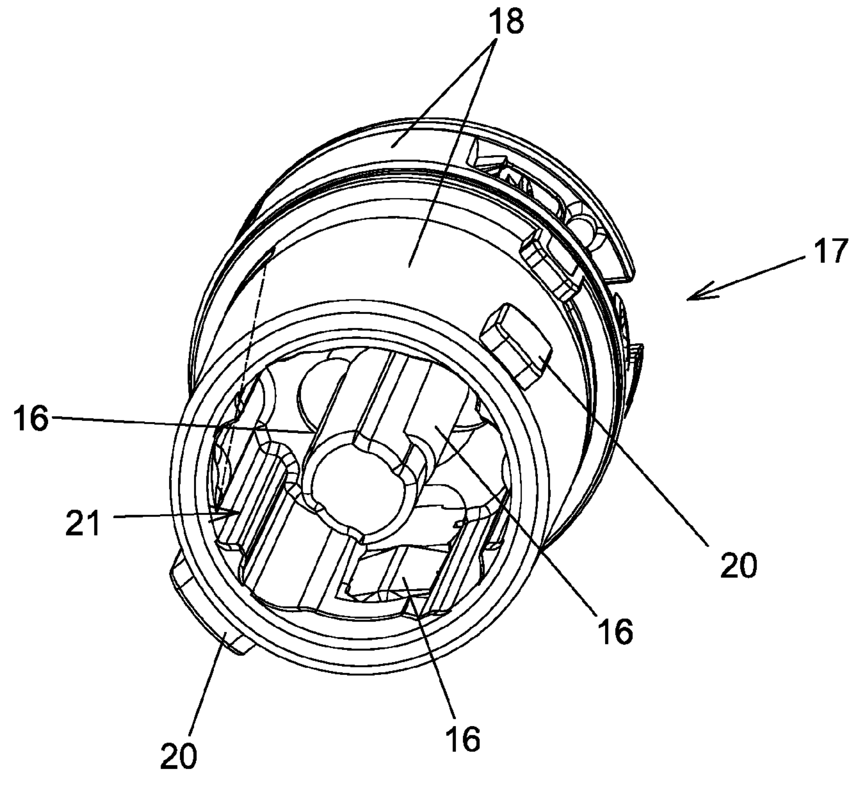

FIGS. 1 and 2 show a first electrical plug 17 according to the invention. The electrical plug 17 can serve to transmit electrical power and/or electrical signals. In the exemplary embodiments shown here, the electrical plugs 17 are purely electrical plugs. However, as mentioned, electrical plugs 17 according to the invention can also be designed as hybrid plugs and, in addition to the electrical plug contacts 15 for transmitting electrical power and/or electrical signals, can also have optical contacts for transmitting optical signals. The housing 18 of the electrical plug is only partially shown in FIGS. 1 and 2. It may additionally have, for example, outer shell elements or the like, which are not shown here but are also not relevant to the invention.

FIG. 1 shows a view in which one can see the strand insertion openings 19 of the plug housing 18 into which the strands 2 are inserted in order to then be clamped in the respective strand clamping body 4 by means of the clamping screws 5 using the strand protective plate 1. FIG. 2 shows a view of the electrical plug 17 of FIG. 1 from the opposite direction, so that one can see into the insertion space 21 of the plug housing 18. The contact pins 16 of the electrical plug contacts 15 are located in this insertion space 21. Corresponding mating contacts of a corresponding mating plug, not shown here, are inserted into the insertion space 21. FIG. 2 also clearly shows that there are contact pins 16 arranged both centrally in the insertion space 21 and at the edge of the outer wall of the plug housing 18.

Index lugs 20 are arranged on the outside of the plug housing 18. This is generally known. They serve to prevent the plug 18 from being mated with a corresponding mating plug in an incorrect position.

Figure 3:
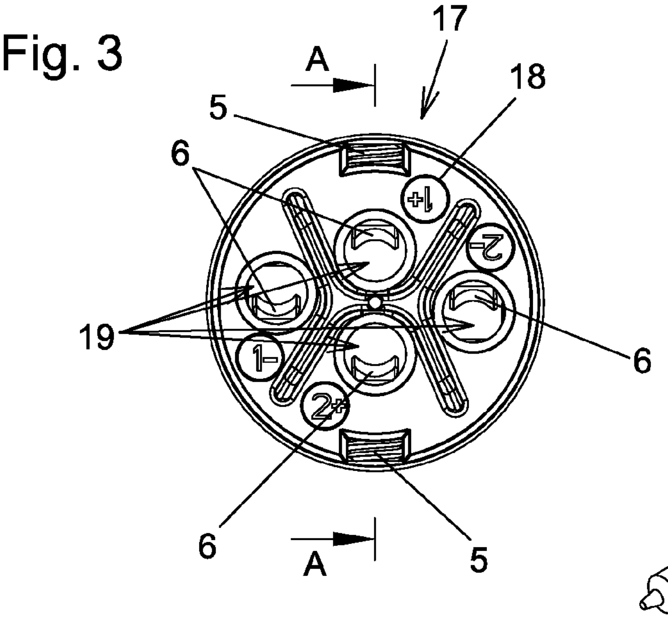
Figure 4:
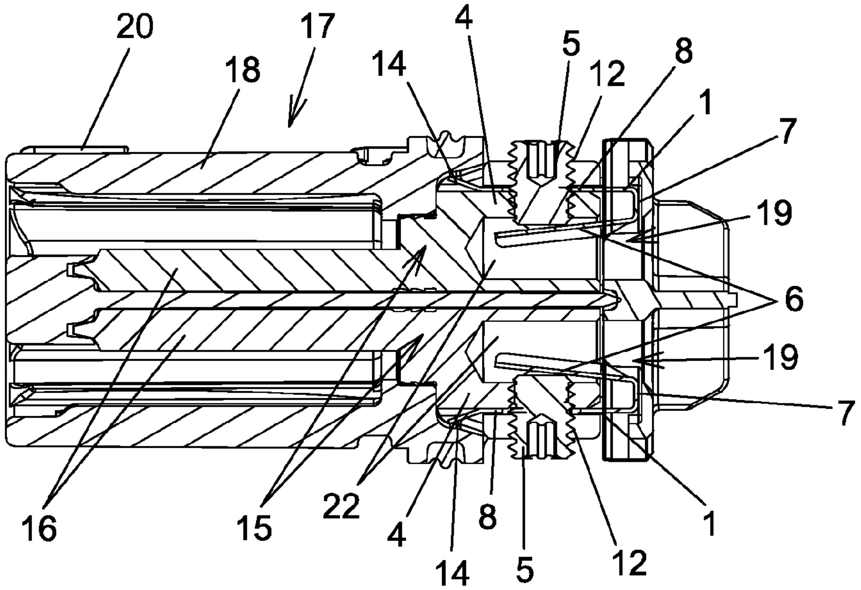
Figure 8:
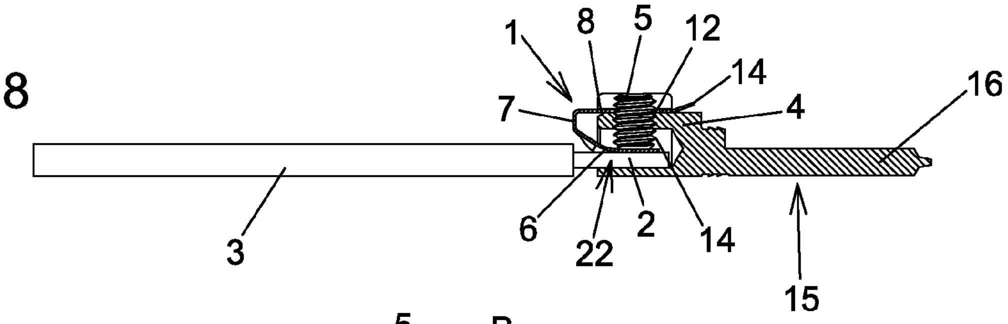

FIG. 3 shows a frontal view of the plug housing 18 and the strand insertion openings 19 arranged therein. The strand clamping tongues 6 of the respective strand protective plates 1 can already be seen here. The clamping screws 5 arranged at the edges can also be seen. In FIG. 3, the section line A-A is drawn. FIG. 4 shows a longitudinal section through the electrical plug 17 along this section line A-A. In the longitudinal section according to FIG. 4, it can be seen how two electrical plug contacts 15 are arranged inside the housing 18. Their contact pins 16 are centrally located in the insertion space 21 of the plug housing 18. The contact pins 16 of these electrical plug contacts 15 are formed integrally with a respective strand clamping body 4. A clamping screw 5 is screwed into the strand clamping body 4 in each case. According to the invention, each electrical plug contact 15 comprises a strand protective plate 1 according to the invention. The strand protective plate 1 according to the invention used in the exemplary embodiments shown here is shown separately in FIGS. 16 to 19 and is also explained separately there. However, it can already be clearly seen in FIG. 4 that the strand protective plate 1 has a strand clamping tongue 6 which is provided for contact with the strand 2 when the strand 2 not yet shown here is fixedly clamped in the strand receiving space 22 by means of the clamping screw 5 with interposition of the strand clamping tongue 6. The latter is shown in FIG. 8 and will be explained further below. In addition to the strand clamping tongue 6, the strand protective plate 1 has a contact region 8 for bearing against the strand clamping body 4 and a bent-over region 7. The strand clamping tongue 6 is connected to the contact region 8 by means of the bent-over region 7. The contact region 8 contains the leadthrough opening 9 through which the clamping screw 5 is passed. At the end of the contact region 8 of the strand protective plate 1 opposite the bent-over region 7, a fixing lug 14 is arranged in the preferred exemplary embodiment shown here. This is angled towards the contact region 8 and serves to fix the electrical plug contact 15 in the housing 18, as can also be seen in FIG. 4.

The strands 2 not shown in FIG. 4 can be inserted through the strand insertion opening 19 in the plug housing 18 into the respective strand receiving space 22 of the respective strand clamping body 4 in order to be clamped there by means of the clamping screw 5 with the interposition of the strand clamping tongue 6.

Figure 5:
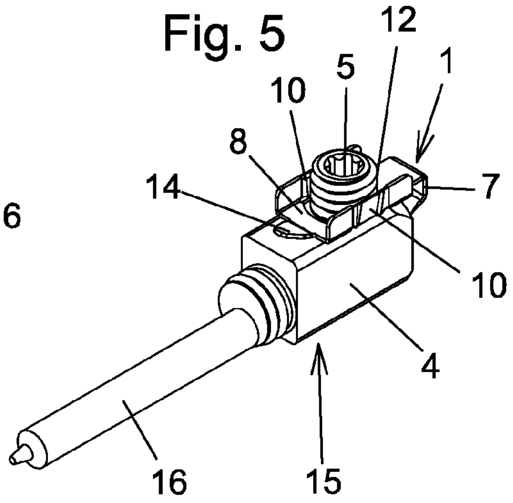
Figure 6:
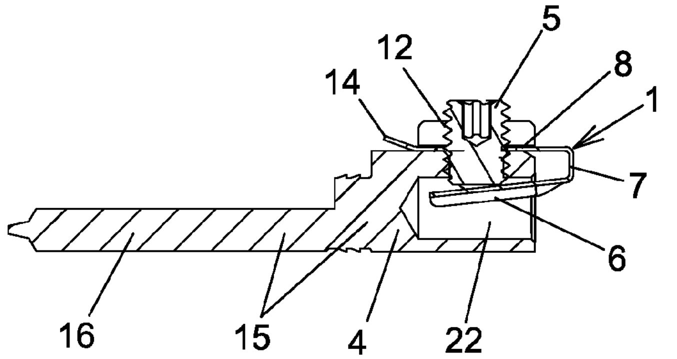

FIGS. 5 and 6 show the electrical plug contacts 15 from FIG. 4 once again detached from the plug housing 18. FIG. 5 is a perspective external view, FIG. 6 a longitudinal section. In FIGS. 5 and 6 it can be clearly seen that in the electrical plug contacts 15 shown here the respective contact pin 16 is integrally connected to the strand clamping body 4. Preferably, this integral component is a turned part. In FIG. 6, it can also be seen clearly how the strand protective plate 1 rests with its contact region 8 against the strand clamping body 4 and extends with its strand clamping tongue 6 into the strand receiving space 22 of the strand clamping body 4.

Figure 7:
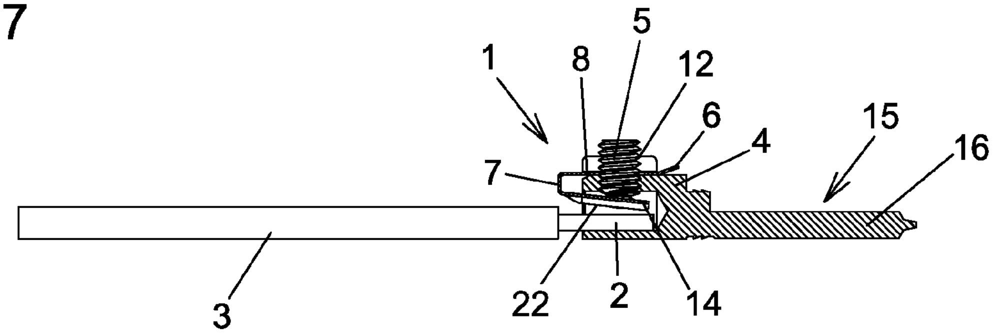

FIG. 7 now shows an illustration with a longitudinal section through the electrical plug contact 15 according to FIGS. 4 to 6, wherein in FIG. 7 a strand 2 of an electrical cable 3 is now inserted into the strand receiving space 22 of the strand clamping body 4. FIG. 7 shows the state before the strand 2 is clamped in the strand clamping body 4. The fixedly clamped state, on the other hand, is shown in FIG. 8. There it can be clearly seen how the clamping screw 5, which is screwed into the strand clamping body 4 to a correspondingly large extent, acts on the strand 2 by means of the strand protective plate 1 or, in particular, its strand clamping tongue 6 in order to clamp it firmly in the strand clamping body 4. Specifically, the clamping screw 5 presses the strand clamping tongue 6 against the strand 2 to such an extent that the latter is clamped between the strand clamping tongue 6 and the opposite wall of the strand clamping body 4 bounding the strand receiving space 2.

Figure 9:
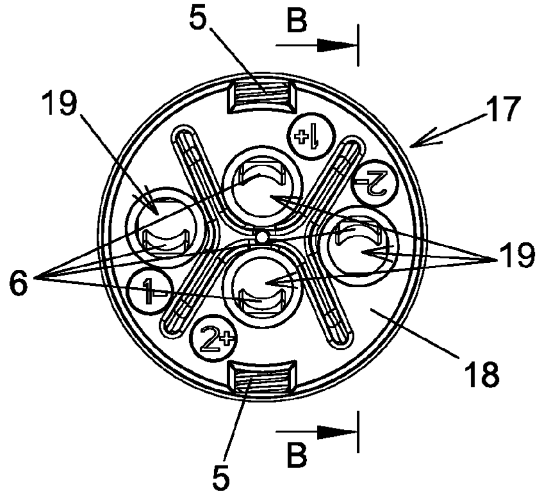
Figure 10:
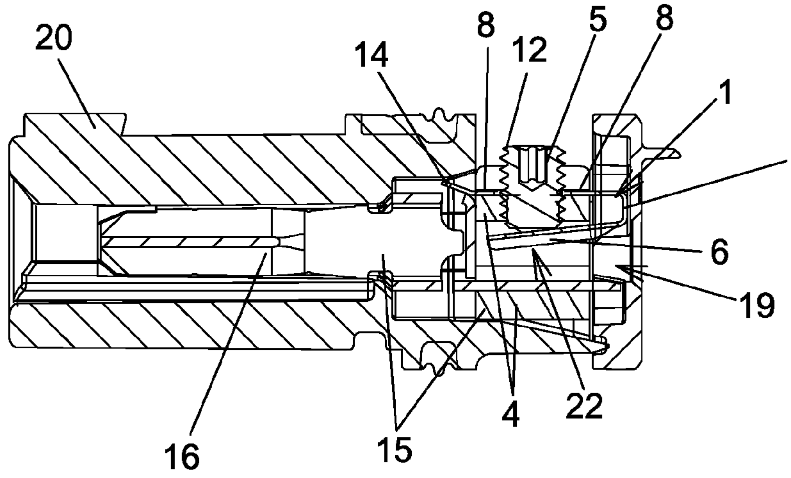

FIG. 9 shows the same view as FIG. 3 of the electrical plug 17 of this first exemplary embodiment. Here, however, the section line B-B is drawn. FIG. 10 shows the corresponding longitudinal section through the plug housing 18 and the electrical plug contact 15 arranged there, the contact pin 16 of which is located at the outer region of the insertion space 21. Here it is shown by way of example that the electrical plug contact 15 does not necessarily have to be of integral design. Here, the contact pin 16 is a separate component which is clamped together with the strand 2 in the strand clamping body 4. This makes it possible to design the contact pin 16, as also implemented here, as a stamped and bent part that can be manufactured relatively inexpensively. The strand protective plate 1 used here is the same as for the electrical plug contact 15 according to FIGS. 4 to 8. This also applies to the clamping screw 5 passed through the leadthrough opening 9 of the strand protective plate 1 and screwed into the strand clamping body 4.

Figure 11:
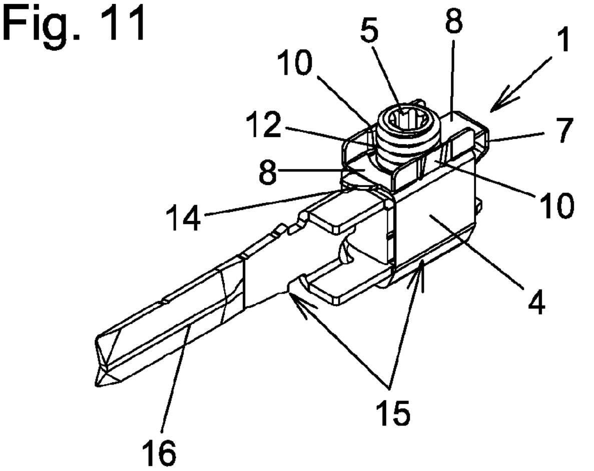
Figure 12:
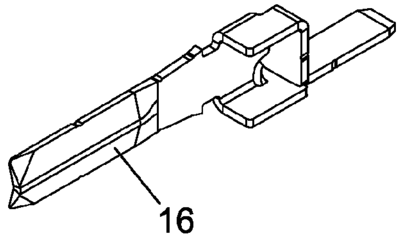
Figure 13:
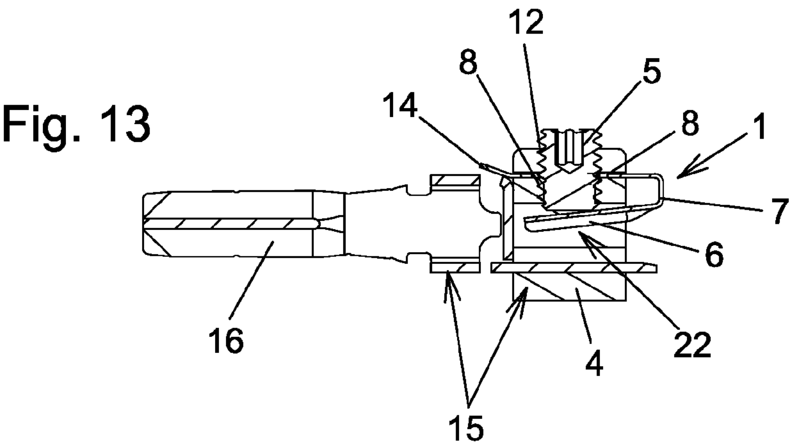
Figure 14:
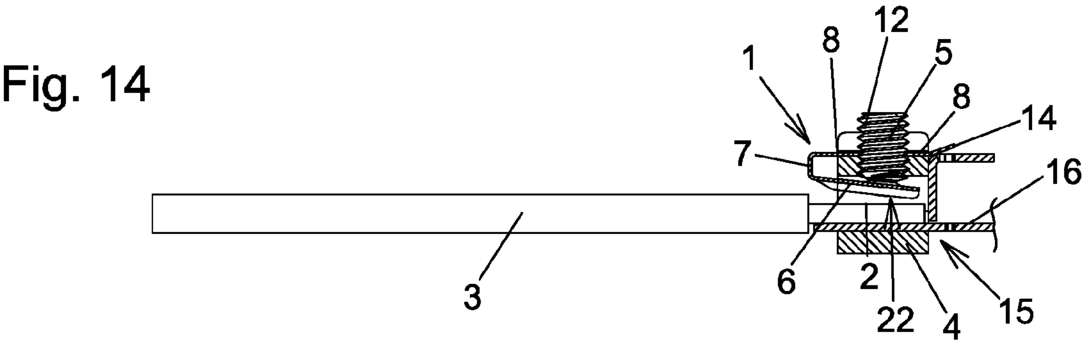
Figure 15:
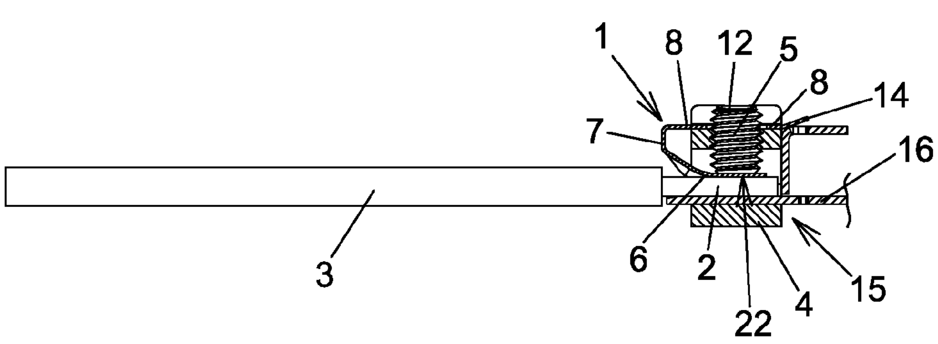

FIG. 11 shows this type of electrical plug contact 15 detached from the plug housing 18. FIG. 12 shows the contact pin 16, which is designed here as a stamped and bent part, detached from all other components. FIG. 13 again shows a longitudinal section through this type of electrical plug contact 15. As can be seen in particular in FIG. 10, the fixing lug 14 has the same function as in the variant shown on the basis of FIGS. 4 to 8. In FIGS. 10 and 13, it can be clearly seen how the corresponding end of the contact pin 16 and the strand clamping tongue 6 of the strand protective plate 1 are arranged in the strand receiving space 22 of the strand clamping body 4 so that the strand 2 can be inserted between them, as can be seen in FIG. 14. FIG. 15 again shows the condition in which the strand clamping tongue 6 is pressed against the strand 2 by means of the clamping screw 5 in such a way that both the strand 2 and the contact pin 16 are clamped in the strand receiving space 22 of the strand clamping body 4.

For the sake of completeness, it should of course be pointed out that the plug housing 18 is advantageously designed, as also realized here in this exemplary embodiment, in such a way that it holds the respective contact pin 16 shown in FIGS. 10 to 15 in position even if the contact pin 16 is not yet clamped by means of the strand 2, the strand protective plate 4 and the clamping screw 5.

Figure 16:
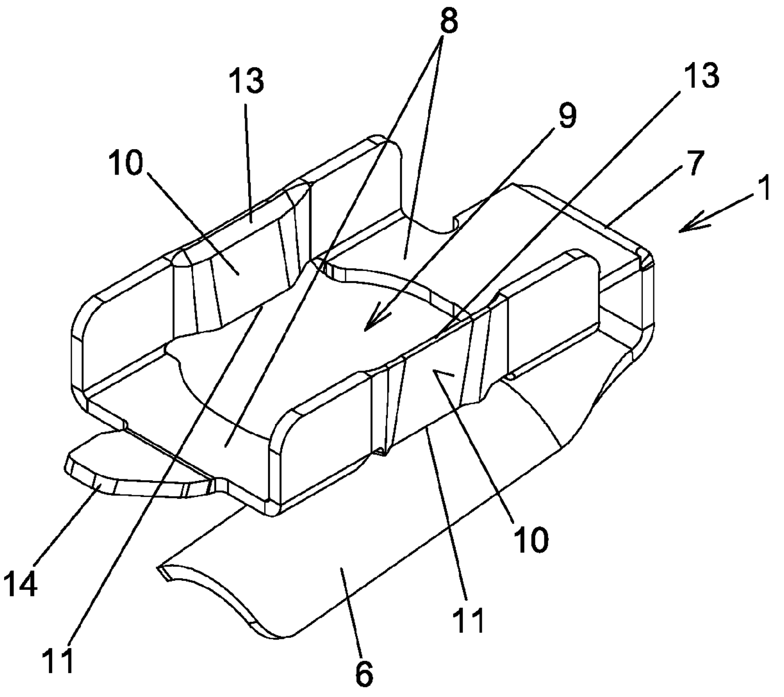
Figure 17:
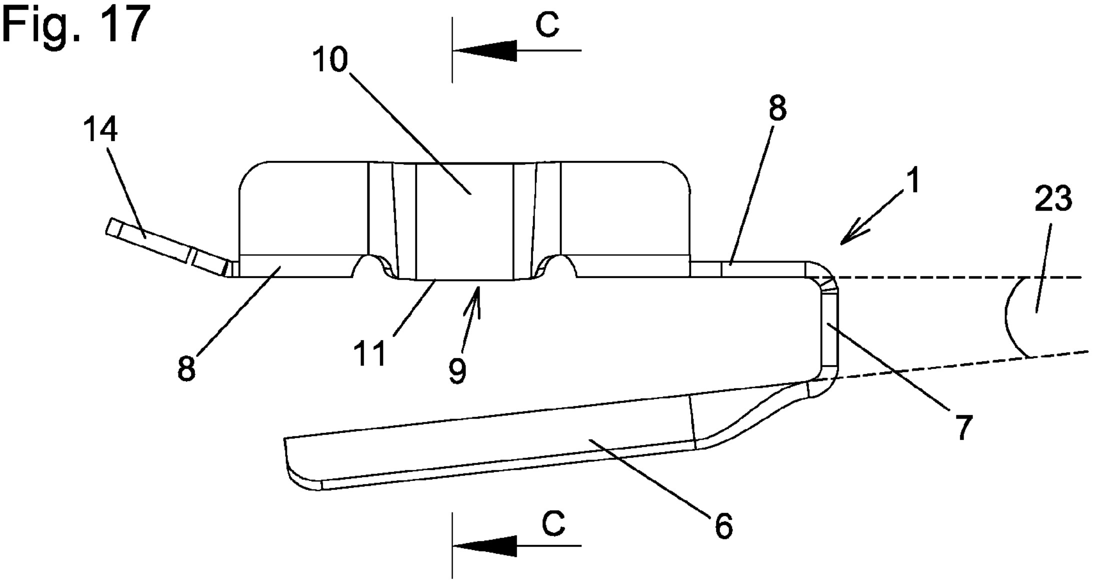

FIGS. 16 and 17 now show the strand protective plate 1 designed according to the invention, which is used in the exemplary embodiments shown here, detached from all other components of the electrical plug 17 or the electrical plug contact 15. Firstly, it is clearly shown that the contact region 8 and the strand clamping tongue 6 are connected to each other by means of the bent-over region 7. The contact region 8 also contains the leadthrough opening 9 through which the clamping screw 5 not shown in FIGS. 16 and 17 can be passed. In the variant shown here, a clamping jaw 10 is formed in each case on the contact region 8 on opposite sides of the leadthrough opening 9 and adjacent to the leadthrough opening 9 for clamping retention of the clamping screw 5 guided through the leadthrough opening 9 between the clamping jaws 10. As already explained at the beginning, however, only one of the clamping jaws 10 arranged adjacent to the leadthrough 9 would also be sufficient for fixedly clamping the clamping screw 5 guided through the leadthrough opening 9. In FIGS. 16 and 17, it can also be seen that each of the clamping jaws 10 has a freely projecting end edge 11 with which, as shown with reference to FIGS. 20 and 21, the respective clamping jaw 10 can engage in the thread 12 of the clamping screw.

In FIGS. 16 and 17, it can also be seen that the strand clamping tongue 6 is preferably curved in order to encompass the strand 2 at least in certain areas during clamping.

The strand clamping tongue 6 and the contact region 8, as seen in a side view, can be arranged parallel to each other in the yet unloaded state. In order to simplify the assembly of the strand protective plate 1 on the strand clamping body 4, however, it is provided in preferred variants, as shown for example in FIG. 17, that in the unloaded state the strand clamping tongue 6 and the contact region 8, as seen in the side view shown, diverge at an angle 23 opening in the direction away from the bent-over region 7. As already explained at the outset, this angle 23 lies favorably in a range between 4° and 10°, particularly preferably between 5° and 7°. This slight angular position between the strand clamping tongue 6 and the contact region 8 in the unloaded state of the strand protective plate 1 simplifies the insertion of the strand clamping tongue 6 into the strand receiving space 22 of the strand clamping body 4.

Figure 18:
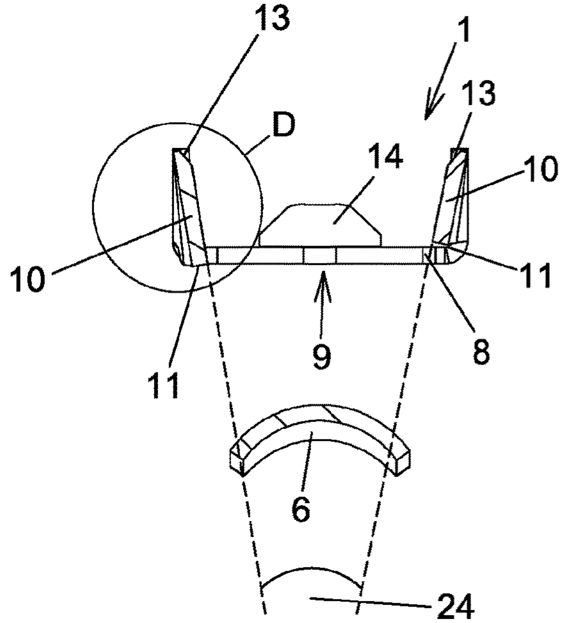

FIG. 18 shows a cross-section through the strand protective plate 1 along the section line C-C from FIG. 17. In FIG. 18, it can be clearly seen that in preferred exemplary embodiments, the end edge 11 of one of the clamping jaws 10 extends further in the direction towards the strand clamping tongue 6 than the end edge 11 of the clamping jaw 10 arranged on the opposite side of the leadthrough opening 9 thereto. The function of this different length design of the clamping jaws 10 will be explained further below with reference to FIG. 21.

FIG. 18 also clearly shows that the clamping jaws 10 arranged on the opposite sides of the leadthrough opening 9 and adjacent to the leadthrough opening 9 are preferably arranged so as to diverge obliquely relative to one another starting from their respective end edges 11. Particularly preferably, the clamping jaws 10 enclose an angle 24 in the range from 10° to 60°, preferably from 10° to 30°, relative to one another in the unloaded state. In the exemplary embodiment shown here, the angle is 24°.

Figure 19:
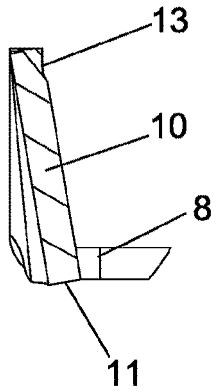

FIG. 19 shows the region D from FIG. 18 enlarged. Here, both the end edge 11 and the insertion bevel 13 are clearly visible at the end of the clamping jaw 10 opposite the freely projecting end edge 11. The insertion bevel 13 facilitates the insertion or screwing in of the clamping screw 5 between the clamping jaws 10.

Figure 20:
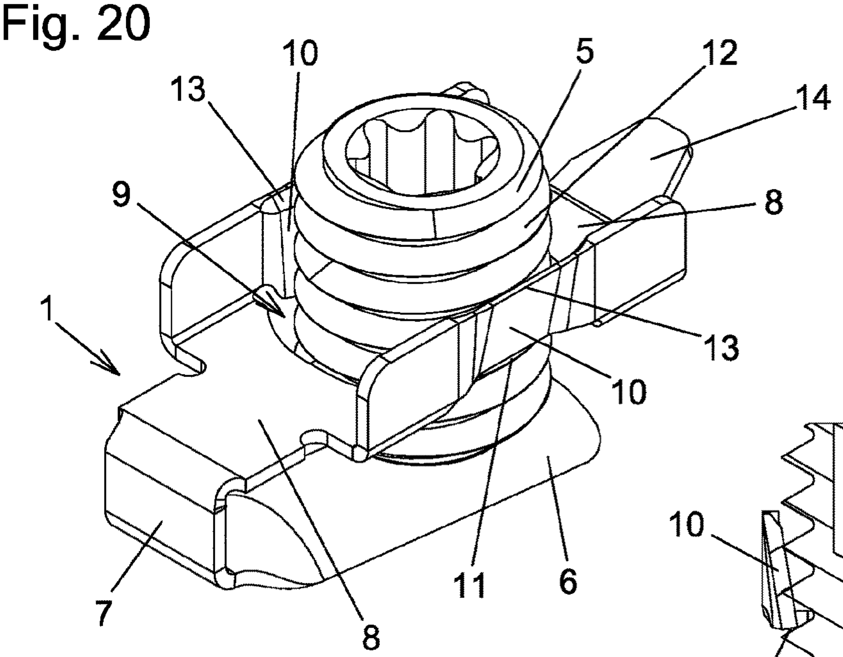

FIG. 20 shows in a perspective view how the clamping screw 5 is clamped between the clamping jaws 10. It is preferably provided, as shown in the cross-section according to FIG. 21, that the end edges 11 engage in the thread 12 of the clamping screw 5.

Figure 21:
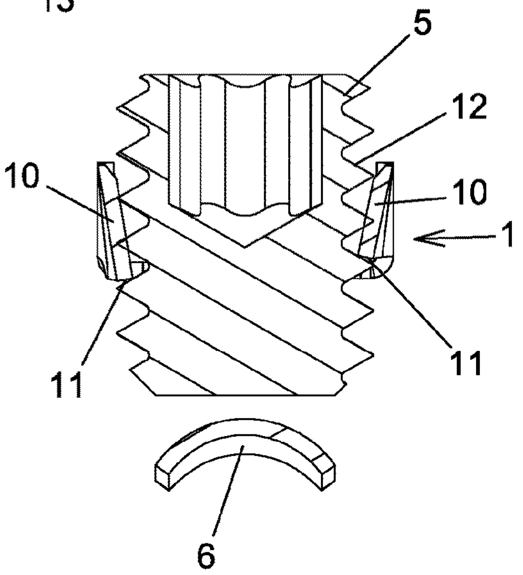

The different arrangement of the end edges 11 in the direction of the strand clamping tongue 6 can be used, as shown in FIG. 21, to adapt the position of the end edges 11 to the thread pitch of the thread 12 of the clamping screw 5 to be used. Particularly preferably, as also shown in FIG. 21, it is then provided that one of the end edges 11 extends further in the direction of the strand clamping tongue 6 than the end edge 11 of the clamping jaw 10 arranged on the opposite side of the leadthrough opening 9 by the amount of half the thread pitch of the clamping screw 5. In this way, as already explained at the beginning, an unintentional skewing of the clamping screw 5 can also be prevented when it is fed through between the clamping jaws 10 and their end edges 11.

In the illustration according to FIG. 21, one of the thread crests of the thread 12 is shown inside a respective clamping jaw 10. This is purely a problem of the drawing. In reality, the thread 12 can either cut into the clamping jaws 10 or the clamping jaws 10 are pushed slightly further apart by the thread 12. This does not change the function shown.

Finally, FIGS. 22 to 26 show other variants of electrical plugs 17 which can be equipped with strand protective plates 1 according to the invention and the various variants of electrical plug contacts 15 already explained with reference to the first exemplary embodiment. This therefore does not need to be explained again. In the description of FIGS. 22 to 26, only the differences from the first embodiment example according to FIGS. 1 to 21 will be discussed.

Figure 22:
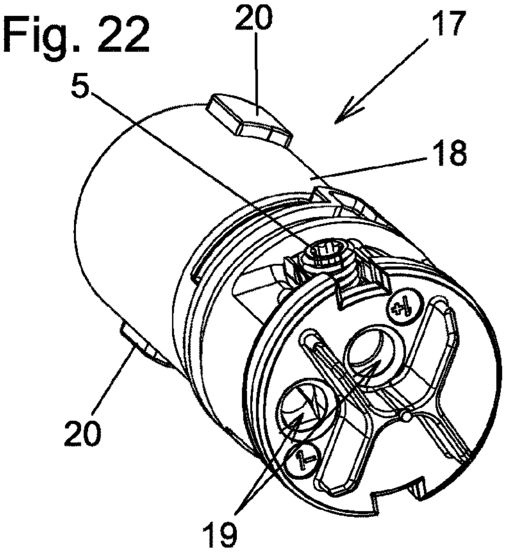
Figure 23:
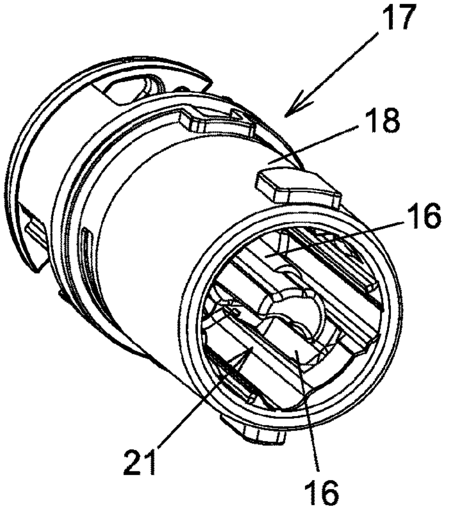

In FIGS. 22 and 23, there are only two electrical plug contacts 15 in the electrical plug 17 and its plug housing 18. This can be easily seen from the fact that there are also only two strand insertion openings 19 in the plug housing 18. Looking into the insertion space 21 in FIG. 23, it can be seen that a contact pin 16 of one of the two electrical plug contacts 15 is again arranged centrally in the insertion space 21. The electrical plug contact 15 with this contact pin 16 can be designed as shown in FIGS. 5 to 8. The other contact pin 16 in the insertion space 21 of the electrical plug 17 according to FIGS. 22 and 23 is located at the edge of the insertion space 21, which may be an electrical plug contact 15 as shown in FIGS. 11 to 15.

Figure 24:
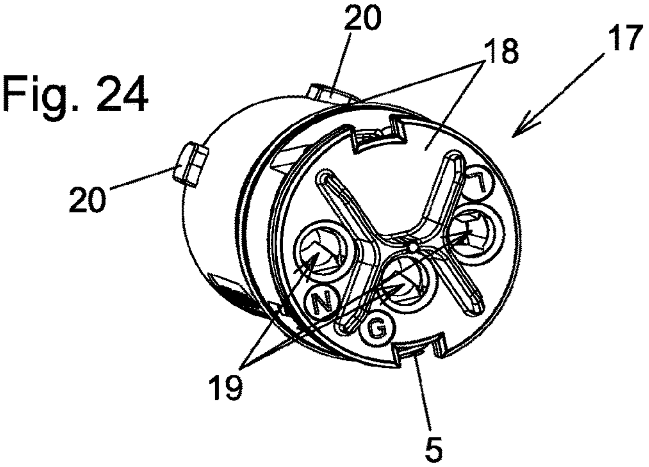
Figure 25:
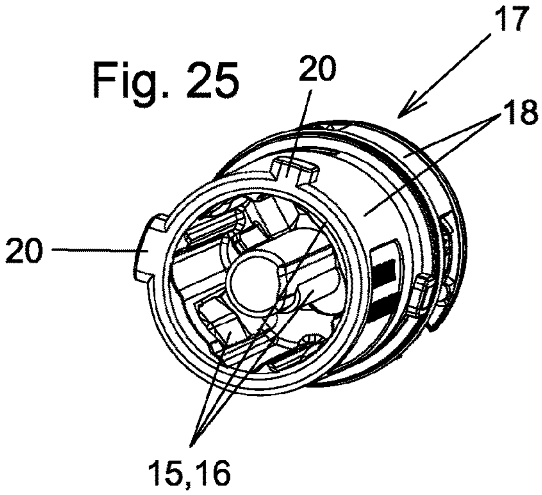
Figure 26:
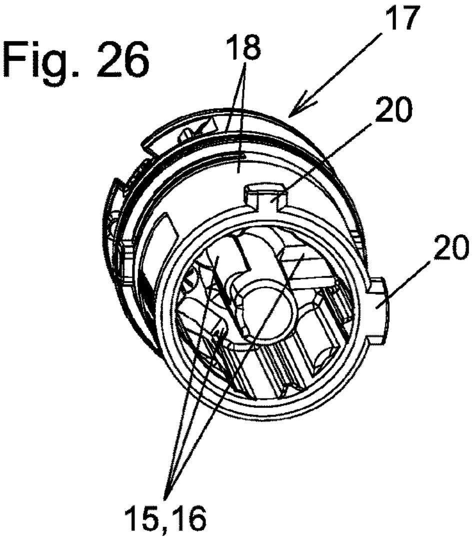

FIGS. 24 to 26 now show variants in which the electrical plug 17 has three strand insertion openings 19 in each case in its plug housing 18 and correspondingly also three electrical plug contacts 15. FIGS. 24 and 25 show a first such exemplary embodiment in two opposing views. Two electrical plug contacts 15 of this exemplary embodiment are formed as shown in FIGS. 10 to 15 and are arranged edge-to-edge in the plug housing 18. In addition, one of the electrical plug contacts 15 is formed as shown in FIGS. 4 to 8 and is centrally arranged in the insertion space 21.

FIG. 26 shows basically the same plug as FIGS. 24 and 25, the only difference being that the index lugs 20 are arranged differently on the plug housing 18. This is to illustrate that the index lugs 20 can be differently designed and arranged, so as to ensure that the respective electrical plug 17 can only be mated with the correct mating plug intended for it. In this way, as is known per se, it can be prevented that plugs and mating plugs are incorrectly plugged together or that incorrect pairs of plugs and mating plugs are plugged together.

LIST OF REFERENCE SIGNS

1 Strand protective plate
2 Strand
3 Electric cable
4 Strand clamping body
5 Clamping screw
6 Strand clamping tongue
7 Bent-over region
8 Contact region
9 Leadthrough opening
10 Clamping jaws
11 End edge
12 Thread
13 Insertion bevel
14 Fixing lug
15 Electrical plug contact
16 Contact pin
17 Electrical plug
18 Plug housing
19 Strand insertion opening
20 Index lug
21 Insertion space
22 Strand receiving space
23 Angle
24 Angle

The invention claimed is:

1. A strand protective plate for clamping a strand of an electric cable in a strand clamping body by means of a clamping screw which acts on the strand protective plate and is screwed into the strand clamping body, wherein the strand protective plate comprises: a strand clamping tongue for bearing against the strand; a bent-over region; and a contact region for bearing against the strand clamping body, wherein the strand clamping tongue is connected by means of the bent-over region to the contact region and a leadthrough opening for guiding the clamping screw through is arranged in the contact region, and wherein at least one clamping jaw is formed on the contact region adjacent to the leadthrough opening for fixedly clamping the clamping screw which is guided through the leadthrough opening; wherein on the contact region on opposite sides of the leadthrough opening and adjacent to the leadthrough opening the clamping jaw is formed in each case for fixedly clamping the clamping screw which is guided through the leadthrough opening between the clamping jaws.

2. The strand protective plate according to claim 1, wherein each clamping jaw has a freely projecting end edge for engagement with a thread of the clamping screw.

3. The strand protective plate according to claim 2, wherein the end edge of one of the clamping jaws extends further in a direction towards the strand clamping tongue than the end edge of the clamping jaw arranged on the side of the leadthrough opening opposite thereto.

4. The strand protective plate according to claim 2, wherein each of the clamping jaws, has an insertion bevel for the clamping screw at its end opposite the freely projecting end edge.

5. The strand protective plate according to claim 2, wherein the clamping jaws arranged on the opposite sides of the leadthrough opening and adjacent to the leadthrough opening are arranged so as to diverge obliquely relative to one another starting from their respective end edges.

6. The strand protective plate according to claim 1, wherein the at least one clamping jaw is arranged, at least in part, on the side of the contact region opposite the strand clamping tongue.

7. The strand protective plate according to claim 1, wherein at least one of: the entire strand protective plate is formed in one piece, as a stamped and bent part, or a fixing lug angled relative to the contact region is arranged on the contact region on the side opposite the bent-over region.

8. An electrical plug contact comprising a contact pin, a strand clamping body, a clamping screw screwed into the strand clamping body, and a strand protective plate according to claim 1, wherein the clamping screw is passed through the leadthrough opening in the contact region of the strand protective plate and is screwed into the strand clamping body and is held in a clamping manner by means of the at least one clamping jaw.

9. An electrical plug for transmitting electrical power and/or electrical signals, wherein the electrical plug comprises:

a plug housing and at least one electrical plug contact according to claim 8.

* * * * *